US012592389B2

(12) United States Patent
Kim et al.

(10) Patent No.: US 12,592,389 B2
(45) Date of Patent: Mar. 31, 2026

(54) POSITIVE ELECTRODE COATING MATERIAL FOR LITHIUM SECONDARY BATTERY, PREPARATION METHOD THEREOF, AND POSITIVE ELECTRODE AND LITHIUM SECONDARY BATTERY COMPRISING THE COATING MATERIAL

(71) Applicants: LG ENERGY SOLUTION, LTD., Seoul (KR); SEOUL NATIONAL UNIVERSITY R&DB FOUNDATION, Seoul (KR)

(72) Inventors: Soohyun Kim, Daejeon (KR); Jong-Chan Lee, Seoul (KR); Kihyun Kim, Daejeon (KR); Kwonnam Sohn, Daejeon (KR); Daun Jeong, Seoul (KR)

(73) Assignees: LG Energy Solution, Ltd., Seoul (KR); Seoul National University R&DB Foundation, Seoul (KR)

( * ) Notice: Subject to any disclaimer, the term of this patent is extended or adjusted under 35 U.S.C. 154(b) by 757 days.

(21) Appl. No.: 17/781,301

(22) PCT Filed: Aug. 10, 2021

(86) PCT No.: PCT/KR2021/010541
§ 371 (c)(1),
(2) Date: May 31, 2022

(87) PCT Pub. No.: WO2022/035172
PCT Pub. Date: Feb. 17, 2022

(65) Prior Publication Data
US 2022/0411269 A1    Dec. 29, 2022

(30) Foreign Application Priority Data
Aug. 10, 2020    (KR) ........................ 10-2020-0099787

(51) Int. Cl.
*H01M 4/62* (2006.01)
*C01B 32/198* (2017.01)
(Continued)

(52) U.S. Cl.
CPC ........... *H01M 4/625* (2013.01); *C01B 32/198* (2017.08); *H01M 4/133* (2013.01); *H01M 10/052* (2013.01)

(58) Field of Classification Search
CPC ........ H01M 4/38; H01M 4/583; H01M 4/625; H01M 4/133
See application file for complete search history.

(56) References Cited

U.S. PATENT DOCUMENTS

2013/0137054 A1* 5/2013 Jiang ..................... C08F 220/54
137/67
2014/0234702 A1    8/2014 Zhang et al.
(Continued)

FOREIGN PATENT DOCUMENTS

CN        103077766 A      5/2013
CN        104091928 A      10/2014
(Continued)

OTHER PUBLICATIONS

Haiping Su, "Polycation Binders: An Effective Approach toward Lithium Polysulfide Sequestration in Li-S Batteries", 2017, ACS Publications, ACS Energy Letters 2017 2 (11), 2591-2597 (Year: 2017).*
(Continued)

*Primary Examiner* — Imran Akram
(74) *Attorney, Agent, or Firm* — Bryan Cave Leighton Paisner LLP

(57) ABSTRACT
Disclosed are a positive electrode coating material for a lithium secondary battery including graphene oxide surface-modified with cationic functional groups, a preparation
(Continued)

method thereof, and a positive electrode and a lithium secondary battery comprising the coating material. The positive electrode coating material prevents the leaching of lithium polysulfide, thereby improving battery performance.

14 Claims, 7 Drawing Sheets

(51) Int. Cl.
  H01M 4/133 (2010.01)
  H01M 10/052 (2010.01)

(56) References Cited

U.S. PATENT DOCUMENTS

| | | | |
|---|---|---|---|
| 2015/0311504 A1 | 10/2015 | Hong et al. | |
| 2016/0141620 A1* | 5/2016 | Cairns | H01M 4/38 |
| | | | 252/182.1 |
| 2017/0077546 A1 | 3/2017 | Zhamu et al. | |
| 2017/0207489 A1 | 7/2017 | Zhamu et al. | |
| 2017/0222227 A1 | 8/2017 | Lux et al. | |
| 2018/0351161 A1* | 12/2018 | Liu | C08F 220/34 |
| 2019/0027793 A1 | 1/2019 | Joo et al. | |
| 2019/0153176 A1 | 5/2019 | Zhang et al. | |
| 2019/0194417 A1* | 6/2019 | Wei | C07D 303/24 |
| 2019/0350197 A1* | 11/2019 | Kolb | A01N 25/28 |
| 2021/0151833 A1 | 5/2021 | Song et al. | |

FOREIGN PATENT DOCUMENTS

| | | |
|---|---|---|
| CN | 105047982 A | 11/2015 |
| CN | 105938761 A | 9/2016 |
| CN | 106684389 A | 5/2017 |
| CN | 108463908 A | 8/2018 |
| CN | 109860506 A | 6/2019 |
| CN | 111106317 A | 5/2020 |
| CN | 107158405 B | 6/2020 |
| CN | 111316470 A | 6/2020 |
| CN | 111370628 A | 7/2020 |
| JP | 2013-214482 A | 10/2013 |
| JP | 2016-525265 A | 8/2016 |
| JP | 2019-33094 A | 2/2019 |
| JP | 2019-510337 A | 4/2019 |
| KR | 10-2014-0037725 A | 3/2014 |
| KR | 10-2014-0082994 A | 7/2014 |
| KR | 10-2016-0021848 A | 2/2016 |
| KR | 10-2017-0024918 A | 3/2017 |
| WO | WO-2018183556 A1 * | 10/2018 ............ H01M 4/133 |
| WO | 2019/004220 A1 | 1/2019 |

OTHER PUBLICATIONS

Rodier. (2018). "Modification of Graphene Oxide for Tailored Functionality", Department of Chemistry, Case Western Reserve University, pp. 1-309.

Kumar, et al. (2016). "Covalently Grafted Graphene Oxide-Poly-(Cn) Acrylate Nanocomposites by Surface-Initiated ATRP: An Efficient Anti-friction, Anti-Wear and Pour Point Depressant Lubricating Additive In Oil Media", Industrial & Engineering Chemistry Research, vol. 55, No. 31. pp. 1-33.

Layek, et al. (2013). "A Review on Synthesis And Properties of Polymer Functionalized Graphene". Polymer, vol. 54, pp. 5087-5103.

Jiepeng Rong et al., "Solution Ionic Strength Engineering As a Generic Strategy to Coat Graphene Oxide (GO) on Various Functional Particles and Its Application in High-Performance Lithium-Sulfur (Li-S) Batteries", American Chemical Society Publications, 2013, dx.dol.org/10.1021/nl403404v/Nano Lett. 2014, 14, pp. 473-479.

Qin Tu et al. (2016), "Click synthesis of quarternized poly(dimethylaminoethyl methacrylate) fictionalized graphene oxide with improved antibacterial and antifouling ability," Elsevier, Colloids and Surfaces B: Biointerfaces, vol. 141, Jan. 26, 2016, pp. 196-205.

Weizhong Yuan et al. (2013), "Surface modification of graphene oxide with thermoresponsive polymers via atom transfer radical polymerization: Transition from LCST to UCST," Elsevier, Materials Letters, vol. 107, Jun. 11, 2013, pp. 243-246.

* cited by examiner

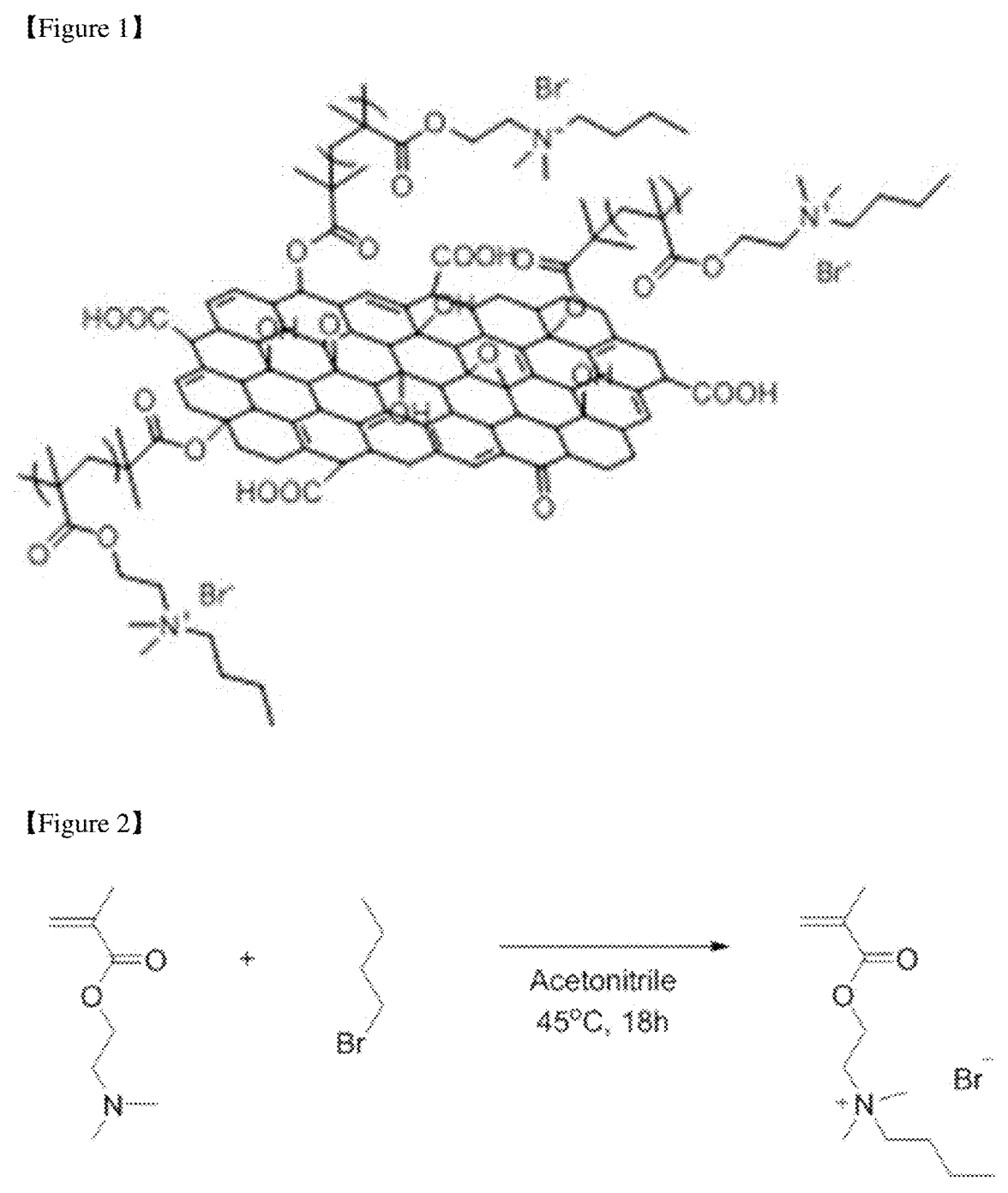

【Figure 3】
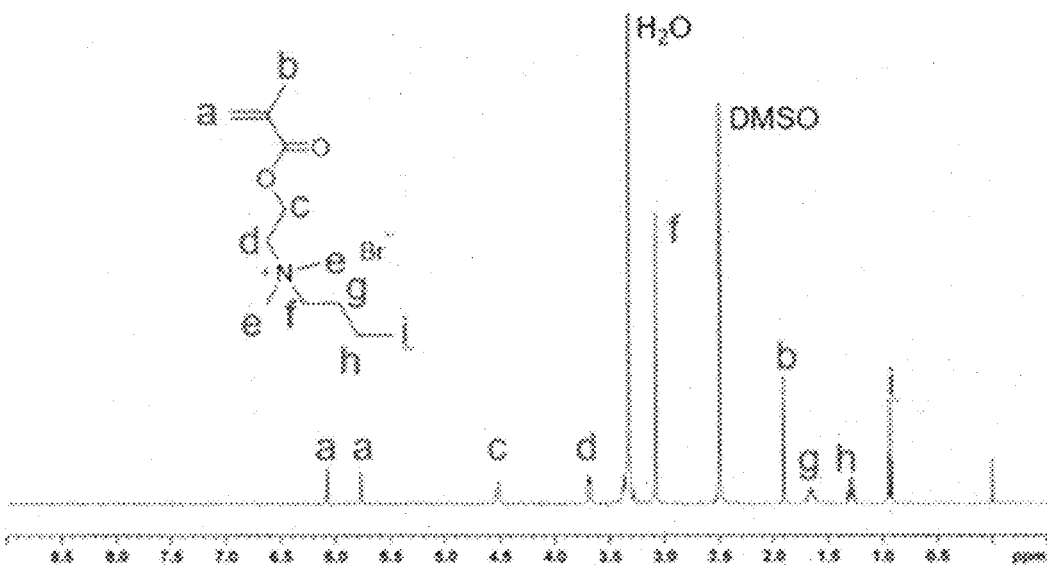
【Figure 4】
【Figure 5】

【Figure 6】
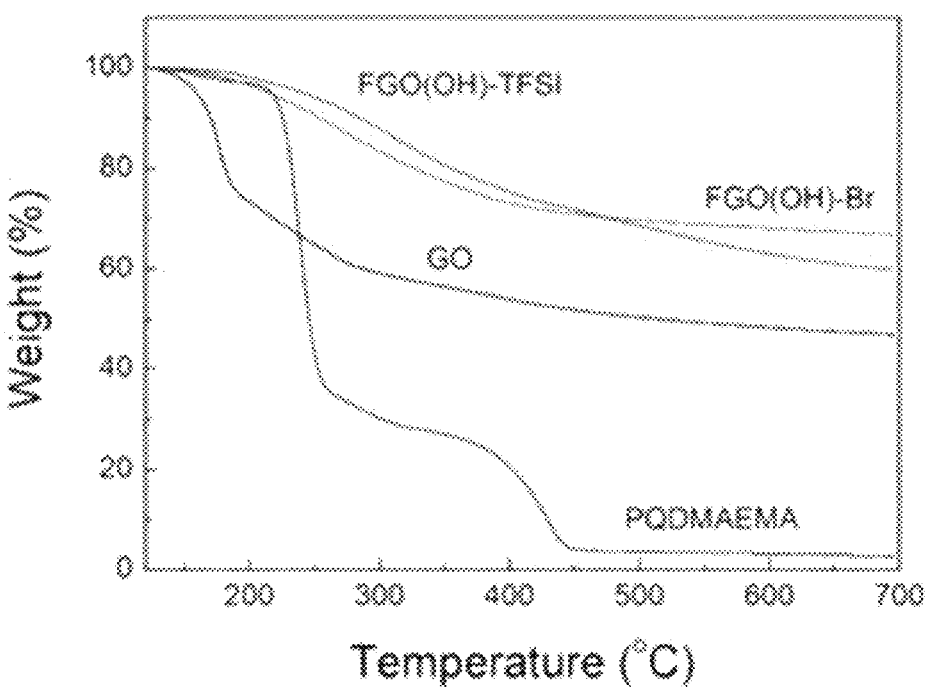
【Figure 7】
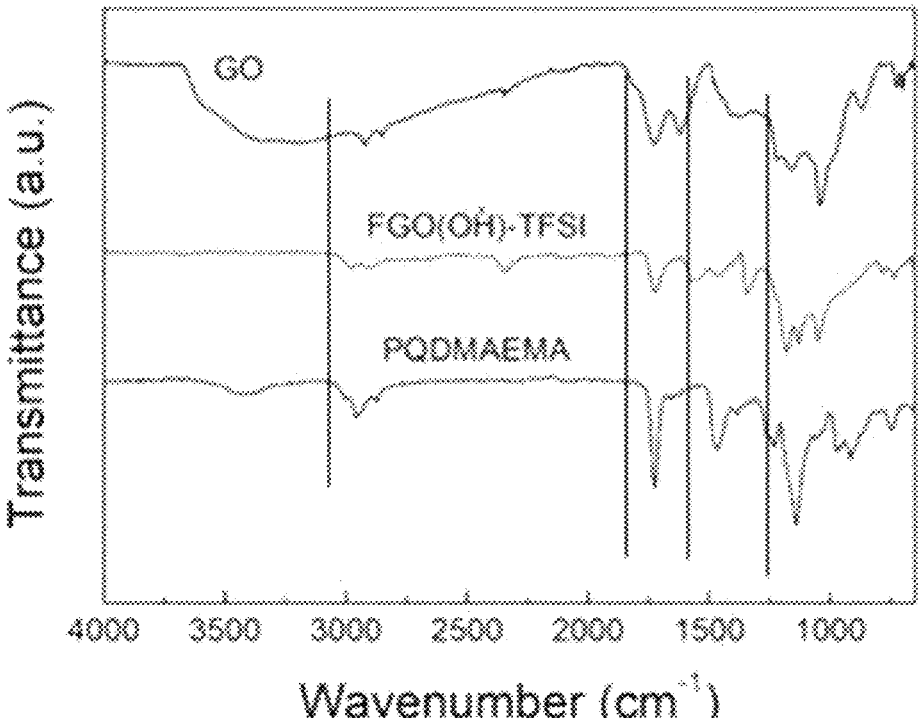

【Figure 8】
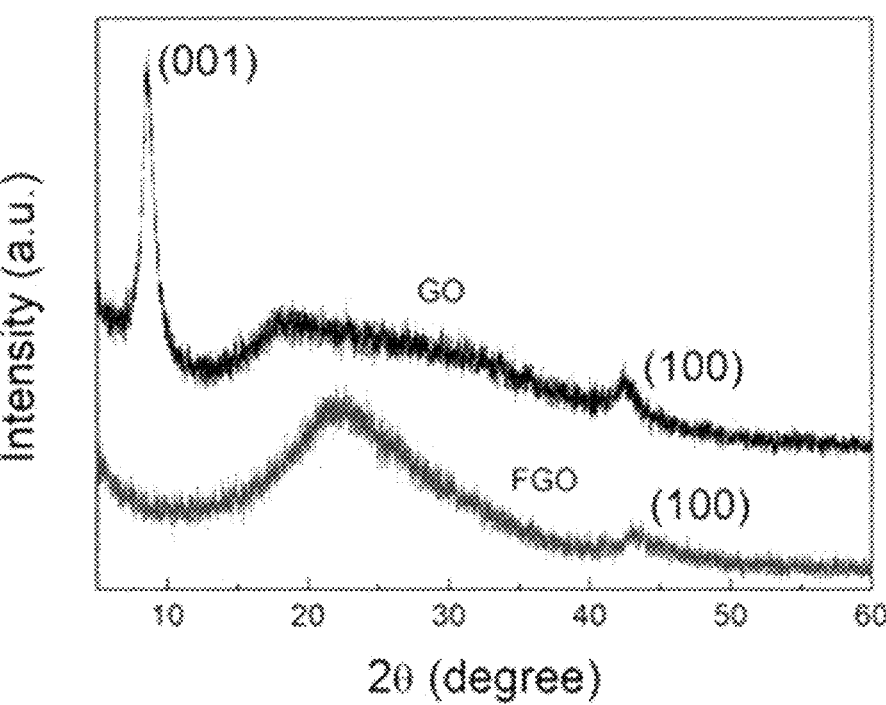
【Figure 9】
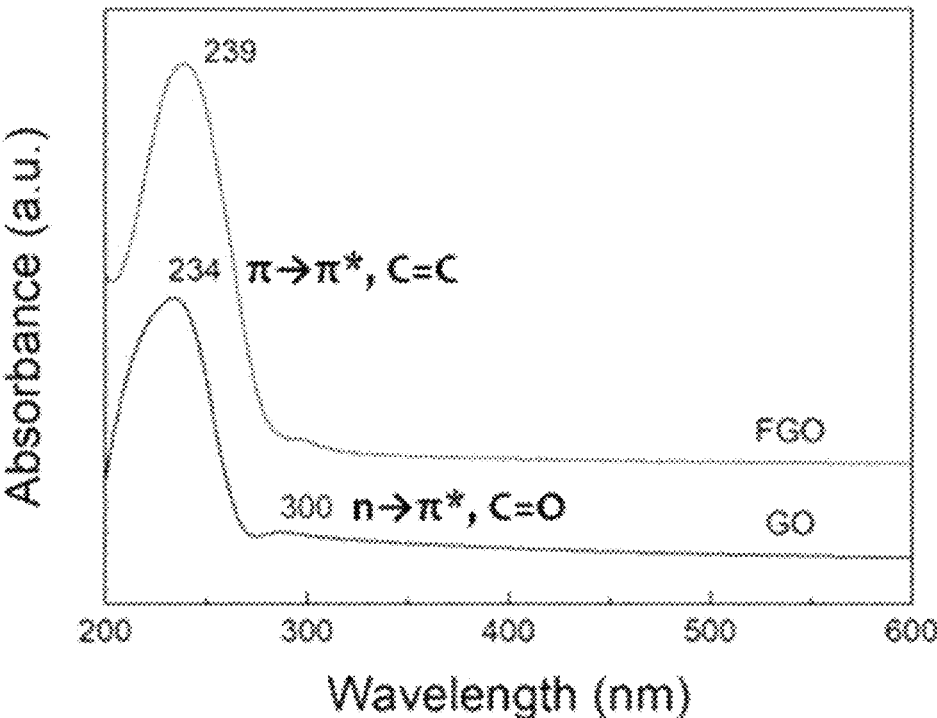

【Figure 10】
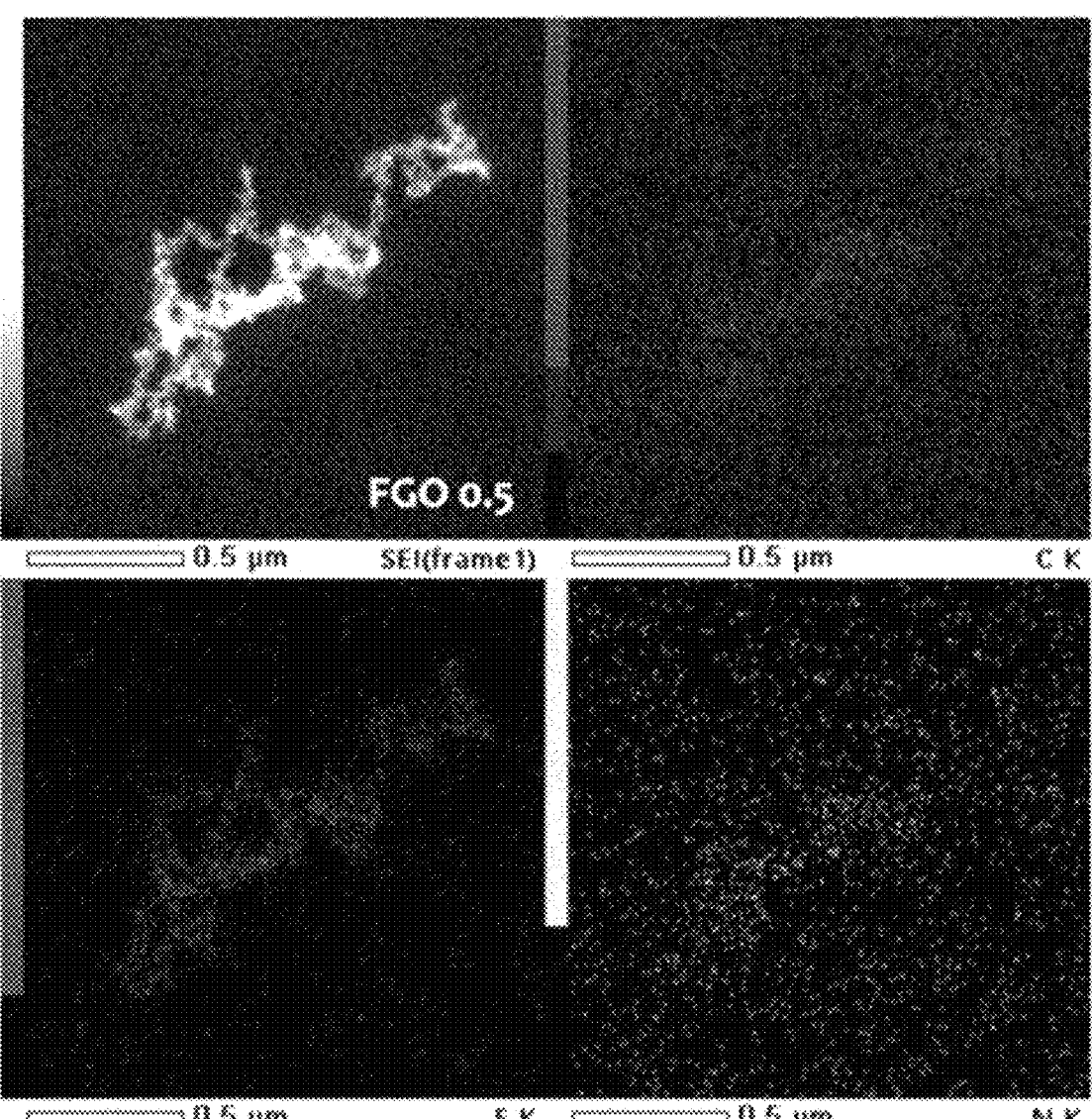

【Figure 11】
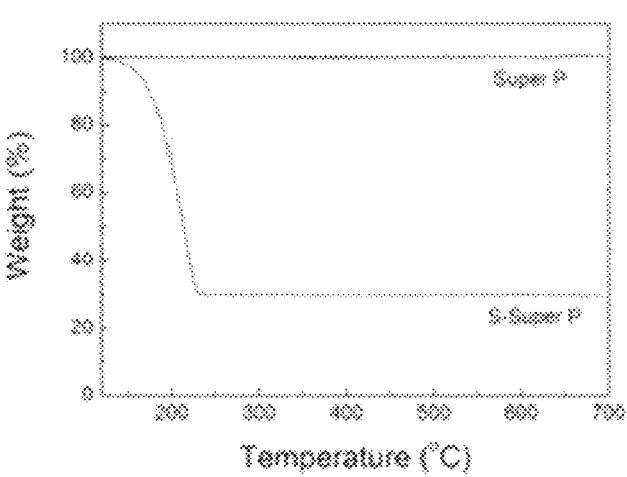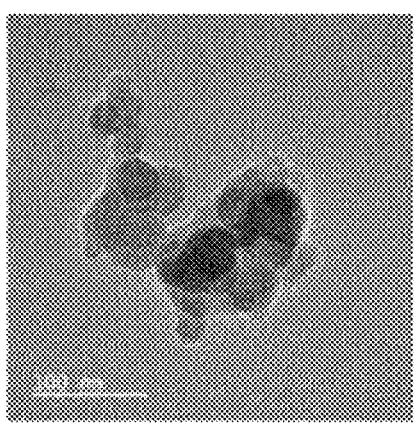
【Figure 12】
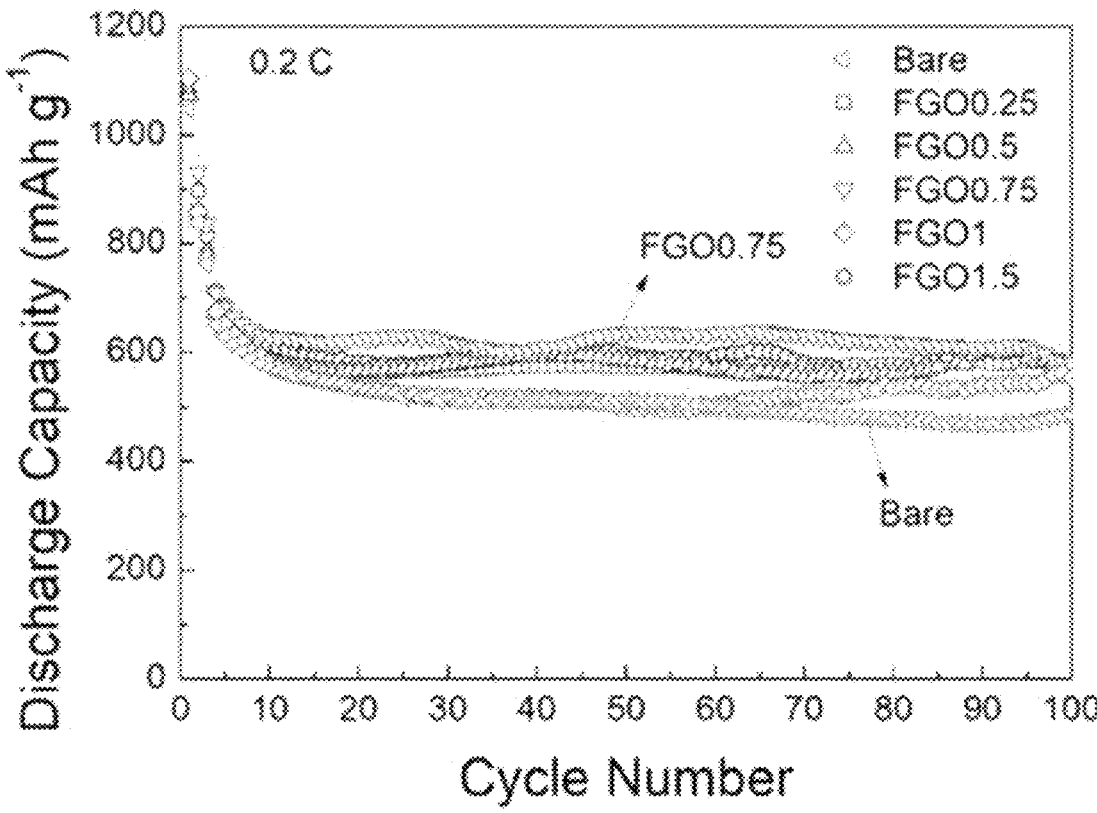

【Figure 13】
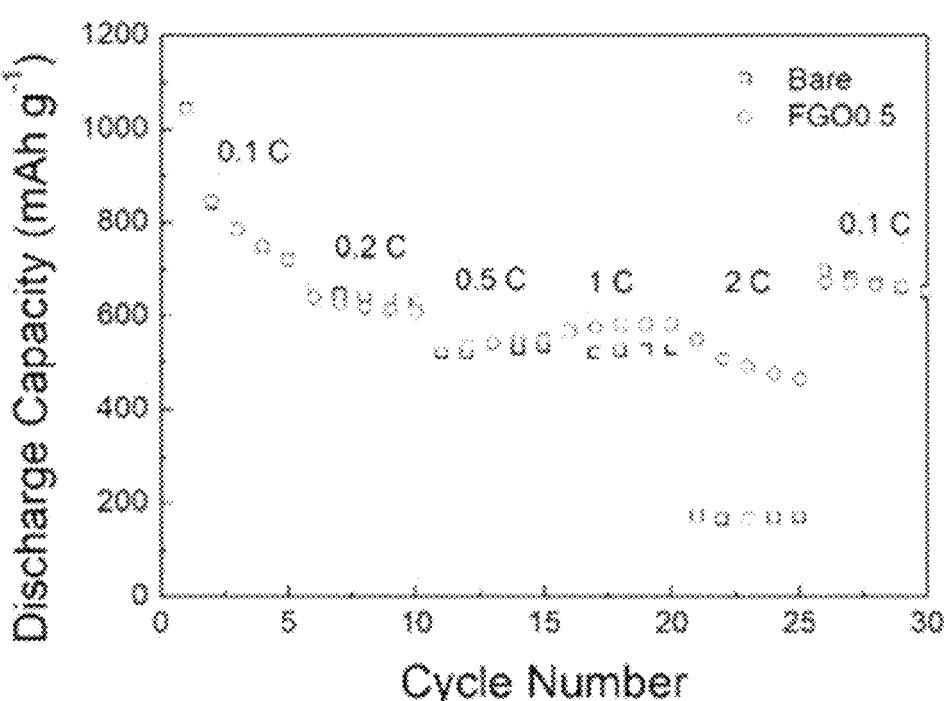
【Figure 14】
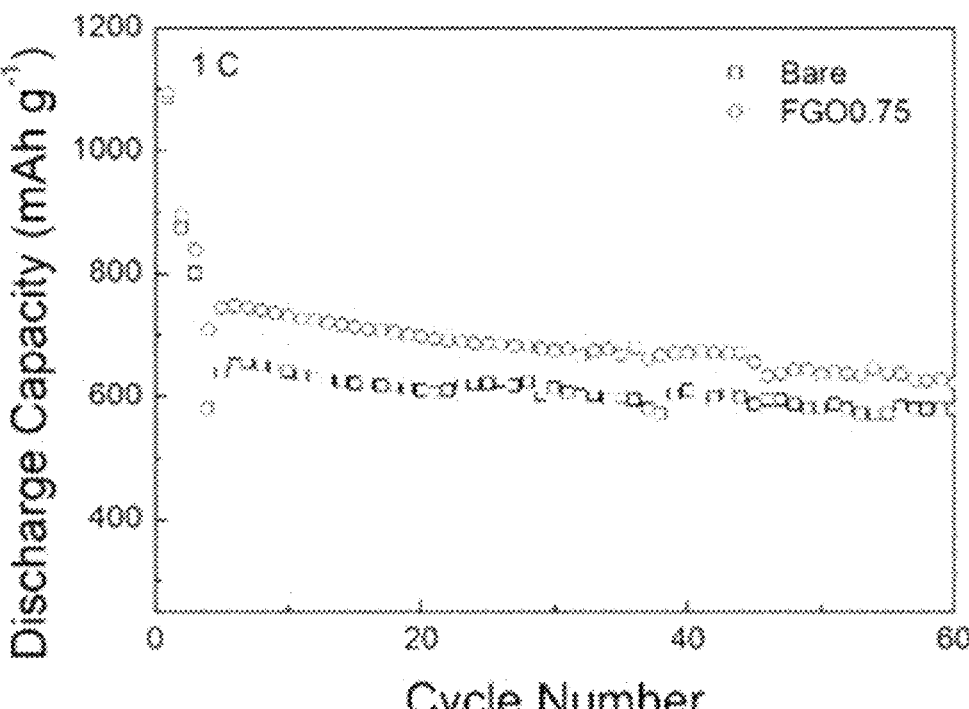

POSITIVE ELECTRODE COATING MATERIAL FOR LITHIUM SECONDARY BATTERY, PREPARATION METHOD THEREOF, AND POSITIVE ELECTRODE AND LITHIUM SECONDARY BATTERY COMPRISING THE COATING MATERIAL

The present application is a National Phase entry pursuant to 35 U.S.C. § 371 of International Application No. PCT/KR2021/010541 filed on Aug. 10, 2021, and claims priority to and the benefit of Korean Patent Application No. 10-2020-0099787, filed on Aug. 10, 2020, all the contents of which are incorporated herein by reference in their entirety.

FIELD

The present invention relates to a positive electrode coating material for a lithium secondary battery, a preparation method thereof, a positive electrode and a lithium secondary battery comprising the coating material, and more particularly, to a positive electrode coating material for a lithium secondary battery, which is produced by grafting a polymer having a cationic functional group on the surface of graphene oxide and which can improve the performance of the battery by preventing lithium polysulfide from leaching when applied as a positive electrode coating material for the lithium secondary battery, a preparation method thereof, and a positive electrode and a lithium secondary battery comprising the coating material.

BACKGROUND

With the growing interest in energy storage technology, as the application of energy storage technology extends to mobile phones, tablets, laptops, and camcorders, and further to electric vehicles (EVs) and hybrid electric vehicles (HEVs), research and development of electrochemical devices are gradually increasing. Electrochemical devices are the field that is receiving the most attention in this respect, and among them, the development of secondary batteries such as a lithium-sulfur battery capable of charging and discharging has been a focus of interest. In recent years, in order to increase the energy density in developing such a battery, research and development on the design of new electrodes and batteries has been conducted.

Among these electrochemical devices, a lithium-sulfur battery (Li—S battery) using lithium metal as a negative electrode and sulfur as a positive electrode has a higher theoretical capacity and energy density (typically about 2,500 Wh/kg) than conventional lithium-ion batteries and is also economical because it uses sulfur, which can be easily obtained from nature, as a positive electrode, and thus is in the spotlight as a next-generation secondary battery that can replace lithium-ion batteries. In such a lithium-sulfur battery, a reduction reaction of sulfur and an oxidation reaction of lithium metal occur during discharging. At this time, sulfur forms lithium polysulfide (LiPS) having a linear structure from $S_8$ having a ring structure. This lithium-sulfur battery is characterized by showing a stepwise discharging voltage until the polysulfide is completely reduced to $Li_2S$.

However, the biggest obstacle of the lithium-sulfur battery in the commercialization is the leaching and shuttle phenomenon of the lithium polysulfide (LiPS, $Li_2S_x$) which occurs during charging and discharging in a battery using a sulfur-based compound as a positive electrode active material and an alkali metal such as lithium as a negative electrode active material. In other words, the biggest problem of the lithium-sulfur battery is a sharp decrease in capacity due to leaching of lithium polysulfide generated in the positive electrode during charging and discharging.

More specifically, lithium polysulfide, which is generated while sulfur used as a positive electrode is reduced during discharging, has high solubility in particular in ether-based liquid electrolytes, is small in size, and thus can pass through a separator, and when it meets lithium metal used as a negative electrode, it causes a side reaction to cause the problem of destabilizing the interface. As a result, the capacity is reduced due to the irreversible loss of the positive electrode active material and the lifetime of the battery is reduced due to the deposition of sulfur particles on the surface of the lithium metal due to side reactions. Therefore, there is a need for a technology that can prevent lithium polysulfide generated from the positive electrode from leaching into the liquid electrolyte during battery operation.

SUMMARY

Therefore, it is an object of the present invention to provide a positive electrode coating material for a lithium secondary battery, which is capable of improving battery performance by applying a coating material obtained by grafting a polymer having a cationic functional group on the surface of graphene oxide as a positive electrode coating material of a lithium secondary battery and thus preventing lithium polysulfide from leaching, and a method for manufacturing the same, and a positive electrode and a lithium secondary battery including the coating material.

In order to achieve the above object, the present invention provides a positive electrode coating material for a lithium secondary battery comprising graphene oxide surface-modified with cationic functional groups.

In addition, the present invention provides a method for manufacturing a positive electrode coating material for a lithium secondary battery comprising the steps of (a) preparing a surface modified graphene oxide by reacting graphene oxide containing one or more of a —COOH group and a —OH group on its surface with a hydrocarbon structural unit having 1 to 10 carbon atoms and comprising 0 to 2 oxygens which comprises a functional group that forms a bond with the —COOH group or —OH group and a functional group that forms a bind with a vinyl group contained in a (meth)acrylate compound; and (b) reacting the surface-modified graphene oxide with (meth)acrylate structural unit grafted with a hydrocarbon group having 2 to 10 carbon atoms and comprising a cationic group.

In addition, the present invention provides a positive electrode for a lithium secondary battery comprising a positive electrode active material; and a positive electrode coating material coated on the surface of the positive electrode active material.

In addition, the present invention provides a lithium secondary battery comprising a positive electrode for the lithium secondary battery; a lithium metal negative electrode; an electrolyte interposed between the positive electrode and the negative electrode; and a separator.

According to the positive electrode coating material for the lithium secondary battery, the method for preparing the same, and the positive electrode and the lithium secondary battery comprising the coating material according to the present invention, the present invention has the advantage that by applying a coating material obtained by grafting a polymer having a cationic functional group on the surface of graphene oxide as a positive electrode coating material of a lithium secondary battery, the leaching of lithium polysulfide is prevented and the performance of the battery can be improved.

BRIEF DESCRIPTION OF THE DRAWINGS

FIG. 1 is a chemical structural formula of the positive electrode coating material for the lithium secondary battery according to an example of the present invention.

FIG. 2 is a reaction scheme showing the process of synthesizing the cationic monomer grafted on the surface of graphene oxide according to an example of the present invention.

FIG. 3 is a reaction scheme showing the process of forming the subsequent reaction initiation site on the surface of graphene oxide according to an example of the present invention.

FIG. 4 is a reaction scheme showing the process of grafting the cationic polymer to the subsequent reaction initiation site formed on the surface of graphene oxide according to an example of the present invention.

FIG. 5 is a graph showing the results of $^1$H NMR analysis of the cationic monomer (QDMAEMA) prepared according to an example of the present invention.

FIG. 6 is a graph showing the results of TGA analysis of the positive electrode coating material prepared according to an example of the present invention.

FIG. 7 is a graph showing the results of FT-IR analysis of the positive electrode coating material prepared according to an example of the present invention.

FIG. 8 is a graph showing the results of XRD analysis of the positive electrode coating material prepared according to an example of the present invention.

FIG. 9 is a graph showing the results of UV-Vis analysis of the positive electrode coating material prepared according to an example of the present invention.

FIG. 10 is an SEM image and an EDS image of the 'sulfur-carbon composite coated with a positive electrode coating material' prepared according to an example of the present invention.

FIG. 11 is a graph of TGA analysis (left) and an image of TEM analysis (right) of the sulfur-carbon composite coated with the positive electrode coating material (FGO(OH)-TFSI) prepared according to an example of the present invention.

FIGS. 12 to 14 are graphs comparing the discharging capacity and lifetime characteristics of the lithium-sulfur batteries according to examples of the present invention and comparative examples.

DETAILED DESCRIPTION

Hereinafter, the positive electrode coating material for the lithium secondary battery, the preparation method thereof, and the positive electrode and the lithium secondary battery comprising the coating material according to the present invention, will be described in detail with reference to the accompanying drawings.

Positive Electrode Coating Material

FIG. 1 is a chemical structural formula of the positive electrode coating material for the lithium secondary battery according to an example of the present invention. As shown in FIG. 1, the positive electrode coating material for the lithium secondary battery according to the present invention comprises graphene oxide whose surface is modified by a cationic functional group.

The positive electrode coating material for the lithium secondary battery according to the present invention is obtained by grafting a polymer having a cationic functional group to the surface of graphene oxide (GO), and modifying the surface of the graphene oxide with a functional group containing cation, and as the coating material is coated on the positive electrode active material, the cationic functional group formed on the surface of the coating material suppresses the leaching of lithium polysulfide, and thus the performance of the lithium secondary battery is improved.

More specifically, the cationic functional group of the positive electrode coating material for the lithium secondary battery is introduced into the hydroxyl group present in large amounts on the surface of graphene oxide through atom transfer radical polymerization (ATRP), and as the cationic functional group is introduced to the surface of the graphene oxide, the dispersibility of the positive electrode coating material may be increased.

In addition, as the cationic functional group is introduced to the surface of graphene oxide, when it is applied to the positive electrode of a lithium-sulfur battery, the leaching of lithium polysulfide is suppressed, so that compared to the case where it is not, the decrease in the discharging capacity according to the cycle is reduced, and the performance improvement at high current density is particularly noticeable.

It is characterized in that such a cationic functional group is bonded to graphene oxide in a state of being contained in a hydrocarbon group having 4 to 70 carbon atoms and comprising 0 to 4 oxygen atoms, and the bonding to the graphene oxide is made by a carbon atom.

More specifically, it is characterized in that the hydrocarbon group having 4 to 70 carbon atoms (preferably, 40 to 50 carbon atoms) and comprising the cationic functional group comprises a (meth)acrylate structural unit grafted with a hydrocarbon group having 2 to 10 carbon atoms and comprising a cationic group, and the (meth)acrylate structural unit has a form bonded to a hydrocarbon structural unit having 1 to 10 carbon atoms that forms a bond with the surface of graphene oxide, and the hydrocarbon having 1 to 10 carbon atoms comprises 0 to 2 oxygens atoms.

Here, the (meth)acrylate structural unit may have a form in which 2 to 5 (meth)acrylates are polymerized, and the hydrocarbon structural unit having 1 to 10 carbon atoms forming a bond with the surface of the graphene oxide may comprise a carbonyl group bonded to the graphene oxide. In addition, the cationic functional group may comprise one or more cations selected from nitrogen cation, oxygen cation and sulfur cation, and among them, it may be preferable to comprise at least nitrogen cation.

More specifically, the cationic functional group may be represented by Formula 1 below (that is, when the cationic functional group is nitrogen cation), and the cationic functional group may further comprise a halogen anion as a counter-ion to a cation included in the cationic functional group, as shown in Formula 1 below.

[Formula 1]

wherein $R_1$, $R_2$, $R_3$, $R_4$, and $R_5$ are hydrogen or an alkyl group having 1 to 4 carbon atoms, X is a halogen group, o, p, and q are each independently an integer from 0 to 4, and n is a natural number from 1 to 5.

(The wave line ( ) indicates the connecting bond with graphene oxide).

Meanwhile, as an example of the cationic functional group represented by Formula 1, may be exemplified.

The graphene oxide serves as an initiator so that a large amount of cationic polymer is grafted onto the surface of graphene oxide, and when coated on positive electrode active material such as sulfur-carbon composite, also serves to increase compatibility with the positive electrode active material.

As described above, the positive electrode coating material for lithium secondary battery of the present invention is coated on the surface of the positive electrode active material to serve as a physical shielding film, and in particular, serves to suppress the volume change of sulfur during charging and discharging of the lithium-sulfur battery.

Preparation Method of Positive Electrode Coating Material

A method of manufacturing a positive electrode coating material for a lithium secondary battery according to the present invention comprises the steps of (a) preparing a surface modified graphene oxide by reacting graphene oxide containing at least one selected from a —COOH group and a —OH group on its surface with a hydrocarbon structural unit having 1 to 10 carbon atoms and comprising 0 to 2 oxygens which comprises a functional group that forms a bond with the —COOH group or —OH group and a functional group that forms a bind with a vinyl group contained in a (meth)acrylate compound and (b) reacting the surface-modified graphene oxide and the (meth)acrylate structural unit grafted with a hydrocarbon group having 2 to 10 carbon atoms and comprising a cationic group.

FIG. 2 is a reaction scheme showing the process of synthesizing the cationic monomer grafted on the surface of graphene oxide according to an example of the present invention, FIG. 3 is a reaction scheme showing the process of forming the subsequent reaction initiation site on the surface of graphene oxide according to an example of the present invention, and FIG. 4 is a reaction scheme showing the process of grafting the cationic polymer to the subsequent reaction initiation site formed on the surface of graphene oxide according to an example of the present invention. Hereinafter, a method of preparing the positive electrode coating material for the lithium secondary battery will be described in more detail with reference to FIGS. 2 to 4.

In the hydrocarbon structural unit having 1 to 10 carbon atoms and comprising 0 to 2 oxygens which comprises a functional group that forms a bond with the —COOH group or —OH group and a functional group that forms a bind with a vinyl group contained in a (meth)acrylate compound in step (a), the functional group forming a bond with the —COOH group or the —OH group may be selected from a carbonyl group, an ether group, an ester group, and a carbonate group substituted with a halogen group, and the functional group that forms a bond with the vinyl group included in the (meth)acrylate compound may be selected from a halogen group, an ether group, an ester group, and a carbonate group.

More specifically, the hydrocarbon structural unit having 1 to 10 carbon atoms and comprising 0 to 2 oxygens which comprises a functional group that forms a bond with the —COOH group or —OH group and a functional group that forms a bind with a vinyl group contained in a (meth) acrylate compound may have a carbonyl group substituted with a halogen group and a carbon atom substituted with a halogen group, and more specifically, the hydrocarbon structural unit having 1 to 10 carbon atoms and comprising 0 to 2 oxygens which comprises a functional group that forms a bond with the —COOH group or —OH group and a functional group that forms a bind with a vinyl group contained in a (meth)acrylate compound may be 2-bromoisobutyryl bromide.

In addition, in the (meth)acrylate structural unit grafted with a hydrocarbon group having 2 to 10 carbon atoms and comprising a cationic group in step (b), the cationic group may include one or more cations selected from nitrogen cation, oxygen cation, and sulfur cation, and among them, it may be preferable to comprise at least nitrogen cation.

In addition, in the (meth)acrylate structural unit grafted with a hydrocarbon group having 2 to 10 carbon atoms and comprising a cationic group, the hydrocarbon group having 2 to 10 carbon atoms comprising a cationic group may be a compound represented by Formula 2 below.

[Formula 2]

wherein $R_4$ and $R_5$ are hydrogen or an alkyl group having 1 to 4 carbon atoms, X is a halogen group, and p and q are each independently an integer from 0 to 4.

In addition, the reaction of step (b) may include a polymerization reaction, and the polymerization reaction may specifically be an atom transfer radical polymerization (ATRP) reaction. In addition, the reaction of step (b) may be carried out at a temperature of 50 to 90° C., preferably 60 to 80° C. for 24 to 72 hours, preferably 36 to 60 hours, but is not limited thereto.

In addition, in the atom transfer radical polymerization reaction of step (b), a catalyst such as CuBr/PMDETA ligand commonly used during atom transfer radical polymerization can be used.

Through the atom transfer radical polymerization reaction of step (b), a cationic functional group is introduced to the surface of graphene oxide, and the dispersibility of the positive electrode coating material can be increased by introducing a cationic functional group to the surface of the graphene oxide, and ultimately, the leaching of lithium polysulfide can be suppressed by being applied to the positive electrode of a lithium-sulfur battery.

On the other hand, after step (b), if necessary, a step of reacting the reaction product finally prepared in step (b) with a lithium salt may be additionally performed, and for example, by reacting the positive electrode coating material with LiTFSI in an aqueous phase, halogen anions may be substituted (or exchanged) with TFSI⁻.

In addition, the mass ratio of the hydrocarbon structural unit having 1 to 10 carbon atoms and comprising 0 to 2 oxygens which comprises a functional group that forms a bond with the —COOH group or —OH group and a functional group that forms a bind with a vinyl group contained in a (meth)acrylate compound to the graphene oxide containing at least one selected from —COOH group and —OH group on its surface in step (a) may be 0.7 to 1.3:1, preferably about 1:1. In addition, the mass ratio of (meth)acrylate structural unit grafted with a hydrocarbon group having 2 to 10 carbon atoms and comprising a cationic group of step (b) to the surface-modified graphene oxide may be 1 to 10:1, preferably 5 to 10:1, more preferably 6 to 8:1.

Positive Electrode for Lithium Secondary Battery

The positive electrode for the lithium secondary battery according to the present invention comprises a positive electrode active material and a positive electrode coating material coated on the surface of the positive electrode active material.

That is, the positive electrode coating material is a positive electrode coating material for a lithium secondary battery described above and may be coated in an amount of 0.2 to 2 parts by weight, preferably 0.75 to 1.5 parts by weight, more preferably 0.9 to 1.1 parts by weight relative to 100 parts by weight of the positive electrode active material. If the content of the positive electrode coating material coated on the surface of the positive electrode active material is out of the above range, there may be a little or no advantage obtained by using the positive electrode coating material.

As such, if the positive electrode coating material containing the graphene oxide surface-modified with functional groups containing cation is coated on the positive electrode active material, the compatibility between the coating layer and the positive electrode active material (especially, sulfur-carbon composite) is increased, and it is possible to suppress the volume change of sulfur during charging and discharging of the lithium-sulfur battery, and above all, the coating material of the present invention serves to trap and adsorb lithium polysulfide so that lithium polysulfide generated at the positive electrode does not leach to the liquid electrolyte during operation of the battery, thereby improving battery performance.

The positive electrode active material preferably contains sulfur (S) atoms, and more preferably may be a sulfur-carbon composite. Considering that since sulfur has an electrical conductivity of about $5.0 \times 10^{-14}$ S/cm and thus is close to nonconductor, electrochemical reaction at the electrode is not easy, and that due to the very large overvoltage, the actual discharging capacity and voltage are far below the theoretical value, a carbon material having electrical conductivity is used together (that is, a structure in which sulfur is supported in the pores of the carbon material).

The sulfur contained in such sulfur-carbon composite may be at least one selected from the group consisting of inorganic sulfur ($S_8$), $Li_2Sn(n \geq 1)$, an organic sulfur compound, and a carbon-sulfur polymer [$(C_2S_x)_n$: x=2.5 to 50, n≥2], among which it may be preferable to apply inorganic sulfur ($S_8$).

In addition, the carbon material constituting the sulfur-carbon composite may be applied without any particular limitation as long as it has a porous structure or a high specific surface area and is commonly used in the art. For example, the carbon material having the porous structure may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon, and its shape can be used without restriction as long as it is in the form of sphere, rod, needle, plate, tube, or bulk and is commonly used in the lithium secondary battery.

The sulfur-carbon composite may have a particle size of 10 to 50 μm. If the particle size of the sulfur-carbon composite is less than 10 μm, there is a problem that the resistance between the particles increases and an overvoltage occurs in the electrode of the lithium-sulfur battery. If the particle size exceeds 50 μm, the surface area per unit weight is reduced, and thus the wetting area with the electrolyte solution in the electrode and the reaction site with the lithium ion are decreased, and the amount of electron transfer relative to the size of the composite is reduced, so that the reaction can be delayed, and as a result, the discharging capacity of the battery can be reduced.

In the positive electrode, the positive electrode coating material is preferably coated on the entire surface of the positive electrode active material, and a cationic functional group is formed in each graphene oxide of the positive electrode coating material. Therefore, it can be said that as a large number of cationic functional groups are densely located on the entire surface of the positive electrode active material, the ability to inhibit the leaching of lithium polysulfide is maximized.

On the other hand, the positive electrode manufactured through the method of manufacturing the positive electrode may further comprise a binder and an electrically conductive material. The binder is a component that assists in the bonding between a positive electrode active material and an electrically conductive material and the bonding to a current collector, and for example, may be, but is not limited to, at least one selected from the group consisting of polyvinylidenefluoride (PVdF), polyvinylidenefluoride-polyhexafluoropropylene copolymer (PVdF/HFP), polyvinylacetate, polyvinylalcohol, polyvinylether, polyethylene, polyethyleneoxide, alkylated polyethyleneoxide, polypropylene, polymethyl(meth)acrylate, polyethyl(meth)acrylate, polytetrafluoroethylene (PTFE), polyvinylchloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode material comprising the positive electrode active material. If the content of the binder is less than 1 part by weight, the adhesive strength between the positive electrode active material and the current collector may be insufficient. If the content of the binder exceeds 50 parts by weight, the adhesive strength is improved, but the content of the positive electrode active material may be reduced accordingly, thereby lowering the capacity of the battery.

In addition, the electrically conductive material is not particularly limited as long as it does not cause side reactions in the internal environment of the lithium secondary battery and has excellent electrical conductivity while not causing chemical changes in the battery. Typically, the electrically conductive material may be graphite or electrically conductive carbon, and may be, for example, but is not limited to, one selected from the group consisting of graphite such as natural graphite or artificial graphite; carbon black such as carbon black, acetylene black, Ketjen black, Denka black, thermal black, channel black, furnace black, lamp black, and summer black; carbon-based materials whose crystal structure is graphene or graphite; electrically conductive fibers such as carbon fibers and metal fibers; carbon fluoride; metal powders such as aluminum and nickel powder; electrically conductive whiskers such as zinc oxide and potassium titanate; electrically conductive oxides such as titanium oxide; electrically conductive polymers such as polyphenylene derivatives; and a mixture of two or more thereof.

The electrically conductive material is typically added in an amount of 0.5 to 50 parts by weight, preferably 1 to 30 parts by weight based on 100 parts by weight of total weight of the positive electrode material comprising the positive electrode active material. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode material is not particularly limited, and conventional methods known in the related art such as coating on the positive electrode active material can be used. Also, if necessary, the addition of the second coating layer with electrical conductivity to the positive electrode active material may replace the addition of the electrically conductive material as described above.

A filler may be selectively added to the positive electrode of the present invention as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; and fibrous materials such as glass fibers and carbon fibers.

The positive electrode current collector may be, but is not limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped $SnO_2$), FTO (F doped $SnO_2$), or an alloy thereof, or aluminum (Al) or stainless steel whose surface is treated with carbon (C), nickel (Ni), titanium (Ti) or silver (Ag) or so on. The shape of the positive electrode current collector may be in the form of a foil, film, sheet, punched form, porous body, foam or the like.

Lithium Secondary Battery

In addition, the present invention provides a lithium secondary battery comprising a positive electrode for the lithium secondary battery, a lithium metal negative electrode, an electrolyte interposed between the positive electrode and the negative electrode, and a separator, and the lithium secondary battery is preferably a lithium-sulfur battery.

In general, the lithium secondary battery is composed of a positive electrode composed of a positive electrode material and a current collector, a negative electrode composed of a negative electrode material and a current collector, and a separator that blocks electrical contact between the positive electrode and the negative electrode and allows lithium ions to move, and comprises an electrolyte solution for conducting lithium ions by being impregnated therein. The negative electrode may be manufactured according to a conventional method known in the art. For example, the negative electrode active material, the electrically conductive material, the binder, and if required, the filler and the like are dispersed and mixed in a dispersion medium (solvent) to form a slurry, and the slurry can be applied onto the negative electrode current collector, followed by drying and rolling it to prepare a negative electrode.

The negative electrode active material may be a lithium metal or a lithium alloy (for example, an alloy of lithium and a metal such as aluminum, zinc, bismuth, cadmium, antimony, silicon, lead, tin, gallium or indium). The negative electrode current collector may be, but is not limited to, platinum (Pt), gold (Au), palladium (Pd), iridium (Ir), silver (Ag), ruthenium (Ru), nickel (Ni), stainless steel (STS), copper (Cu), molybdenum (Mo), chromium (Cr), carbon (C), titanium (Ti), tungsten (W), ITO (In doped $SnO_2$), FTO (F doped $SnO_2$), or an alloy thereof, or copper (Cu) or stainless steel whose surface was treated with carbon (C), nickel (Ni), titanium (Ti) or silver (Ag) or so on. The shape of the negative electrode current collector may be in the form of a foil, film, sheet, punched form, porous body, foam or the like.

The separator is interposed between the positive electrode and the negative electrode, and prevents a short circuit therebetween and serves as a pathway for lithium ions. Olefin-based polymers such as polyethylene and polypropylene, glass fibers or the like may be used in the form of sheets, multilayers, microporous films, woven fabrics, nonwoven fabrics or the like as the separator, but the present invention is not limited thereto. Meanwhile, if a solid electrolyte (e.g., an organic solid electrolyte, an inorganic solid electrolyte, etc.) such as a polymer is used as the electrolyte, the solid electrolyte may also serve as a separator. Specifically, an insulating thin film with high ion permeability and mechanical strength is used. The pore diameter of the separator is generally in the range of 0.01 to 10 μm, and the thickness may generally be in the range of 5 to 300 μm.

As the electrolyte solution which is a non-aqueous electrolyte solution (non-aqueous organic solvent), carbonate, ester, ether, or ketone may be used alone or in combination of two or more thereof, but is not limited thereto. For example, an aprotic organic solvent, such as dimethyl carbonate, diethyl carbonate, dipropyl carbonate, methyl propyl carbonate, ethyl propyl carbonate, methyl ethyl carbonate, ethylene carbonate, propylene carbonate, butylene carbonate, γ-butyrolactone, n-methyl acetate, n-ethyl acetate, n-propyl acetate, phosphoric acid triester, dibutyl ether, N-methyl-2-pyrrolidinone, 1,2-dimethoxyethane, tetrahydrofuran, tetrahydrofuran derivatives such as 2-methyltetrahydrofuran, dimethyl sulfoxide, formamide, dimethylformamide, dioxolane and derivatives thereof, acetonitrile, nitromethane, methyl formate, methyl acetate, trimethoxymethane, sulfolane, methyl sulfolane, 1,3-dimethyl-2-imidazolidinone, methyl propionate, ethyl propionate and the like can be used, but is not limited thereto.

Lithium salts may be added to the electrolyte solution (so-called non-aqueous electrolyte solution containing lithium salt). The lithium salts may comprise, but not limited to, those known to be favorably soluble in non-aqueous electrolyte solutions, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_3$(CF$_2$CF$_3$)$_3$, LiAlCl$_4$, CH$_3$SO$_3$Li, CF$_3$SO$_3$Li, (CF$_3$SO$_2$)$_2$NLi, lithium chloroborane, lithium lower aliphatic carboxylate, lithium tetraphenyl borate, or lithium imide, etc. The (non-aqueous) electrolyte solution may further comprise pyridine, triethylphosphite, triethanolamine, cyclic ether, ethylene diamine, n-glyme, hexamethylphosphoric triamide, nitrobenzene derivatives, sulfur, quinoneimine dyes, N-substituted oxazolidinone, N,N-substituted imidazolidine, ethylene glycol dialkyl ether, ammonium salt, pyrrole, 2-methoxy ethanol, aluminum trichloride or the like, for the purpose of improving charging-discharging characteristics, flame retardancy, and the like. If necessary, halogen-containing solvents such as carbon tetrachloride and ethylene trifluoride may be further added to impart nonflammability, and carbon dioxide gas may be further added to improve the high-temperature conservation characteristics.

The lithium secondary battery of the present invention can be manufactured by a conventional method in the art. For example, the lithium secondary battery can be manufactured by inserting the porous separator between the positive electrode and the negative electrode, and introducing the non-aqueous electrolyte solution. The lithium secondary battery according to the present invention is not only applicable to a battery cell used as a power source of a small device but also particularly suitably usable as a unit cell of a battery module which is a power source of a medium and large-sized device. In this respect, the present invention also provides a battery module in which at least two lithium secondary batteries are electrically connected (in series or in parallel). It is needless to say that the number of lithium secondary batteries comprised in the battery module may be variously adjusted in consideration of the use and capacity of the battery module.

In addition, the present invention provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); electric trucks; electric commercial vehicles; or power storage systems, but the present invention is not limited thereto.

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and that such variations and modifications are within the scope of the appended claims.

[Example 1] Preparation of Positive Electrode Coating Material for Lithium Secondary Battery First, 2-(dimethylamino)ethyl methacrylate (Sigma-aldrich company) and 1-bromobutane (Sigma-aldrich company) were reacted at 45° C. for 18 hours to obtain quaternized 2-(dimethylamino)ethyl methacrylate (i.e., cationic monomer).

Then, graphene oxide (Sigma-aldrich company) was reacted with 2-bromoisobutyryl bromide (Sigma-aldrich company) and triethylamine (Sigma-aldrich company) to form a bromo initiation site on the surface of the graphene oxide. Then, it was subjected to atom transfer radical polymerization reaction (reaction temperature: 70° C., reaction time: 48 hours, catalyst: CuBr/PMDETA ligand) with the cationic monomer prepared above in a mass ratio of 1:7 to prepare graphene oxide grafted with a cationic polymer (i.e., a positive electrode coating material) on its surface (In addition, the prepared positive electrode coating material and LiTFSI were reacted in an aqueous phase to exchange bromine anion (Br$^-$) with TFSI$^-$).

[Experimental Example 1] Chemical Structure Analysis of Cationic Monomer (QDMAEMA)

$^1$H NMR analysis was performed to confirm whether the cationic monomer prepared in Example 1 was normally synthesized. FIG. 5 is a graph showing the results of $^1$H NMR analysis of the cationic monomer (QDMAEMA) prepared according to an example of the present invention.

As described above, as a result of $^1$H NMR analysis to confirm whether the cationic monomer prepared in Example 1 was normally synthesized, as shown in FIG. 5, the chemical structures of the desired cationic monomers were all revealed, and through this, it was confirmed that the cationic monomer was synthesized without any abnormality

[Experimental Example 2] Analysis of Chemical Structure of Positive Electrode Coating Material (Modified Graphene Oxide)

For the positive electrode coating material prepared in Example 1, TGA analysis, FT-IR analysis, XRD analysis, and UV-Vis analyses were performed to check whether cationic polymer (PQDMAEMA) was normally grafted on the surface of graphene oxide. FIG. 6 is a graph showing the results of TGA analysis of the positive electrode coating material prepared according to an example of the present invention, FIG. 7 is a graph showing the results of FT-IR analysis of the positive electrode coating material prepared according to an example of the present invention, FIG. 8 is a graph showing the results of XRD analysis of the positive electrode coating material prepared according to an example of the present invention, and FIG. 9 is a graph showing the results of UV-Vis analysis of the positive electrode coating material prepared according to an example of the present invention.

As described above, for the positive electrode coating material prepared in Example 1, as a result of TGA analysis, FT-IR analysis, XRD analysis and UV-Vis analysis to confirm whether the cationic polymer was normally grafted on the surface of graphene oxide, it was confirmed through FIG. 6 for TGA analysis that the cationic polymer (PQD-MAEMA) of the positive electrode coating material was a linear polymer polymerized using only the cationic monomer (QDMAEMA) as an AIBN initiator (initiator used for radical initiation).

In addition, it was confirmed through FIG. 7 for FT-IR analysis that characteristic peaks of cationic polymer (PQD-MAEMA) contained in the positive electrode coating material appeared, it was confirmed through FIG. 8 for XRD analysis that after modification, the crystal peak of graphene oxide (GO) disappeared, and it was confirmed through FIG. 9 for UV-Vis analysis that the position of the characteristic peaks (234 nm, 300 nm) of graphene oxide is changed. Considering the above, for the positive electrode coating material prepared in Example 1, it can be seen that cationic polymer (PQDMAEMA) was normally grafted onto the surface of graphene oxide.

[Example 2] Preparation of Positive Electrode for Lithium Secondary Battery 0.5 mg (that is, set so that the content of the coating material in the total weight of the positive electrode is 0.25% by weight (FGO 0.25)) of the positive electrode coating material (FGO(OH)-TFSI) prepared in Example 1 was subjected to tip-sonication treatment for 30 minutes and dispersed in acetone, and then mixed with sulfur-carbon composite (prepared by mixing elemental sulfur (sulfur) and super P (carbon) in a weight ratio of 7:3, pulverizing with a mortar, and heat-treating at 155° C. for 30 minutes), and stirred for 15 hours. Then, the stirred solution was dried at 50° C. to remove acetone.

Subsequently, the sulfur-carbon composite coated with the positive electrode coating material (FGO(OH)-TFSI), a binder (polyacrylic acid), and an electrically conductive material (carbon black) were mixed in a weight ratio of 85:10:5, and then, additionally 0.5% by weight of PVA dispersant was added thereto, and the concentration was adjusted so that the solid content in the aqueous phase was 18% by weight, and the resultant was mixed with a thinky mixer to prepare a positive electrode slurry. Finally, the prepared positive electrode slurry was coated on aluminum foil with a 400 μm doctor blade and dried at 50° C. for about 14 hours to prepare a positive electrode for a lithium secondary battery.

[Example 3] Preparation of Positive Electrode for Lithium Secondary Battery

A positive electrode for a lithium secondary battery was prepared in the same manner as in Example 2 above, except that the amount of positive electrode coating material (FGO (OH)-TFSI) prepared in Example 1 was changed from 0.5 mg to 1 mg (that is, set so that the content of the coating material in the total weight of the positive electrode is 0.5% by weight (FGO 0.5)).

[Example 4] Preparation of Positive Electrode for Lithium Secondary Battery

A positive electrode for a lithium secondary battery was prepared in the same manner as in Example 2 above, except that the amount of positive electrode coating material (FGO (OH)-TFSI) prepared in Example 1 was changed from 0.5 mg to 1.5 mg (that is, set so that the content of the coating material in the total weight of the positive electrode is 0.75% by weight (FGO 0.75)).

[Example 5] Preparation of Positive Electrode for Lithium Secondary Battery

A positive electrode for a lithium secondary battery was prepared in the same manner as in Example 2 above, except that the amount of positive electrode coating material (FGO (OH)-TFSI) prepared in Example 1 was changed from 0.5 mg to 2 mg (that is, set so that the content of the coating material in the total weight of the positive electrode is 1% by weight (FGO 1)).

[Example 6] Preparation of Positive Electrode for Lithium Secondary Battery

A positive electrode for a lithium secondary battery was prepared in the same manner as in Example 2 above, except that the amount of positive electrode coating material (FGO (OH)-TFSI) prepared in Example 1 was changed from 0.5 mg to 3 mg (that is, set so that the content of the coating material in the total weight of the positive electrode is 1.5% by weight (FGO 1.5)).

[Comparative Example 1] Preparation of Positive Electrode for Lithium Secondary Battery A sulfur-carbon composite prepared by mixing elemental sulfur (sulfur) and super P (carbon) in a weight ratio of 7:3, pulverizing with a mortar, and heat-treating at 155° C. for 30 minutes, a binder (polyacrylic acid) and an electrically conductive material (carbon black) are mixed in a weight ratio of 85:10:5 and then, additionally 0.5% by weight of PVA dispersant was added thereto, and the concentration was adjusted so that the solid content in the aqueous phase was 18% by weight, and the resultant was mixed with a thinky mixer to prepare a positive electrode slurry. Then, the prepared positive electrode slurry was coated on aluminum foil with a 400 μm doctor blade and dried at 50° C. for about 14 hours to prepare a positive electrode for a lithium secondary battery.

[Experimental Example 3] Component Analysis of Sulfur-Carbon Composite Coated with Positive Electrode Coating Material For the positive electrode for lithium secondary battery prepared in Example 3, TEM analysis and EDS analysis were performed to confirm whether the positive electrode coating material (FGO(OH)-TFSI) was normally coated on the surface of the sulfur-carbon composite. FIG. 10 is an SEM image (corresponding to the upper left image) and an EDS image of the 'sulfur-carbon composite coated with a positive electrode coating material' prepared according to an example of the present invention.

As described above, for the positive electrode for lithium secondary battery prepared in Example 3, as a result of TEM analysis and EDS analysis to confirm whether the positive electrode coating material (FGO(OH)-TFSI) was normally coated on the surface of the sulfur-carbon composite, elements F and N were detected as shown in FIG. 10. Through this, it was confirmed that a positive electrode coating material (FGO(OH)-TFSI) was normally coated on the surface of the sulfur-carbon composite.

Meanwhile, FIG. 11 is a graph of TGA analysis (left drawing) and an image of TEM analysis (right drawing) of the sulfur-carbon composite coated with the positive electrode coating material (FGO(OH)-TFSI) prepared according to an example of the present invention. In particular, as can be seen from the left drawing of FIG. 11, it was confirmed that the content of sulfur in the sulfur-carbon composite is 70% by weight, and through this, it was confirmed that even if prepared as in the present invention, the content of sulfur is well maintained.

[Examples 7-11, Comparative Example 2] Manufacture of Lithium-Sulfur Battery The positive electrodes prepared in Examples 2 to 6 and Comparative Example 1 were positioned to face the lithium metal negative electrodes, and then, Celgard separators were interposed between the positive electrodes and the negative electrodes. Then, an electrolyte solution prepared by dissolving LiTFSI and LiNO₃ at concentrations of 1M and 0.2M in DOL/DME solvent, respectively, was injected into the case to prepare a coin cell type lithium-sulfur battery.

[Experimental Example 4] Evaluation of Discharging Capacity and Lifetime Characteristics of Lithium Secondary Battery For lithium-sulfur batteries manufactured in Examples 7 to 11 and Comparative Example 2, discharging capacity and lifetime characteristics were evaluated by setting the current density to 0.2 to 2 C-rate. FIGS. 12 to 14 are graphs comparing the discharging capacity and lifetime characteristics of the lithium-sulfur batteries according to examples of the present invention and comparative examples.

As a result of evaluation of the discharging capacity and lifetime characteristics of lithium-sulfur batteries manufactured in Examples 7 to 11 and Comparative Example 2 as described above, as shown in FIG. 12, it was confirmed that the lithium-sulfur batteries of Examples 7 to 11 in which the positive electrode coating material (FGO(OH)-TFSI) is coated on the positive electrode active material have improved cell performance, as compared to the lithium-sulfur battery of Comparative Example 2 (corresponding to 'Bare' in FIG. 12) that did not use a positive electrode coating material (FGO(OH)-TFSI). In addition, it can be seen from FIGS. 13 and 14 that the lithium-sulfur battery of the present invention exhibits significantly improved cell performance especially at high current density.

The invention claimed is:

1. A positive electrode coating material for a lithium secondary battery comprising:

graphene oxide surface-modified with cationic functional groups, wherein the cationic functional group is bonded to graphene oxide in a state of being contained in a hydrocarbon group having 4 to 70 carbon atoms and 0 to 4 oxygen atoms, wherein the cationic functional group is bonded to the graphene oxide by a carbon atom, and wherein the cationic functional group is represented by Formula 1 below:

[Formula 1]

wherein:

R₁, R₂, R₃, R₄, and R₅ are hydrogen or an alkyl group having 1 to 4 carbon atoms, X is a halogen group, o, p, and q are each independently an integer from 0 to 4, and n is a natural number from 1 to 5.

2. The positive electrode coating material for the lithium secondary battery according to claim 1, wherein the hydrocarbon group having 4 to 70 carbon atoms that contains the cationic functional group comprises a (meth)acrylate structural unit grafted with a hydrocarbon group having 2 to 10 carbon atoms which comprises a cationic group, and wherein the (meth)acrylate structural unit has a form bonded to a hydrocarbon structural unit having 1 to 10 carbon atoms that forms a bond with the surface of graphene oxide, and the hydrocarbon having 1 to 10 carbon atoms comprises 0 to 2 oxygen atoms.

3. The positive electrode coating material for the lithium secondary battery according to claim 2, wherein the (meth)acrylate structural unit has a form in which 2 to 5 (meth)acrylates are polymerized.

4. The positive electrode coating material for the lithium secondary battery according to claim 3, wherein the hydrocarbon structural unit having 1 to 10 carbon atoms that forms a bond with the surface of the graphene oxide comprises a carbonyl group bonded to the graphene oxide.

5. A positive electrode for a lithium secondary battery comprising:

a positive electrode active material; and the positive electrode coating material of claim 1 coated on a surface of the positive electrode active material.

6. The positive electrode for the lithium secondary battery according to claim 5, wherein the positive electrode coating material is coated in an amount of 0.2 to 2 parts by weight based on 100 parts by weight of the positive electrode active material.

7. A lithium secondary battery, comprising:

the positive electrode for the lithium secondary battery of claim 5;

a lithium metal negative electrode;

an electrolyte interposed between the positive electrode and the negative electrode; and a separator.

8. A method for preparing a positive electrode coating material for a lithium secondary battery, comprising the steps of:

(a) preparing a surface modified graphene oxide by reacting graphene oxide containing one or more of a —COOH group and a —OH group on its surface with a hydrocarbon structural unit having 1 to 10 carbon atoms and comprising 0 to 2 oxygens which comprises a functional group that forms a bond with the —COOH group or —OH group and a functional group that forms a bond with a vinyl group contained in a (meth)acrylate compound; and (b) reacting the surface-modified graphene oxide with a (meth)acrylate structural unit grafted with a hydrocarbon group having 2 to 10 carbon atoms and comprising a cationic group, wherein the hydrocarbon group having 2 to 10 carbon atoms and comprising a cationic group is a compound represented by Formula 2 below:

[Formula 2]

$$\text{---(CH}_2)_p\underset{\overset{\displaystyle |}{R_5}}{\overset{\displaystyle X^-\ \ R_4}{\overset{+}{N}}}\text{(CH}_2)_q\text{---}$$

wherein:

R$_4$ and R$_5$ are hydrogen or an alkyl group having 1 to 4 carbon atoms,

X is a halogen group, and p and q are each independently an integer from 0 to 4.

9. The method for preparing the positive electrode coating material for a lithium secondary battery according to claim 8, wherein in the hydrocarbon structural unit having 1 to 10 carbon atoms and comprising 0 to 2 oxygens which comprises a functional group that forms a bond with the —COOH group or —OH group and a functional group that forms a bond with a vinyl group contained in a (meth) acrylate compound, the functional group that forms a bond with the —COOH group or the —OH group is selected from the group consisting of a carbonyl group, an ether group, an ester group, and a carbonate group substituted with a halogen group, and the functional group that forms a bond with the vinyl group contained in the (meth)acrylate compound is selected from the group consisting of a halogen group, an ether group, an ester group, and a carbonate group.

10. The method for preparing the positive electrode coating material for a lithium secondary battery according to claim 8, wherein the hydrocarbon structural unit having 1 to 10 carbon atoms and comprising 0 to 2 oxygens which comprises a functional group that forms a bond with the —COOH group or —OH group and a functional group that forms a bond with a vinyl group contained in a (meth) acrylate compound has a carbonyl group substituted with a halogen group and a carbon atom substituted with a halogen group.

11. The method for preparing the positive electrode coating material for a lithium secondary battery according to claim 8, wherein the hydrocarbon structural unit having 1 to 10 carbon atoms and comprising 0 to 2 oxygens which comprises a functional group that forms a bond with the —COOH group or —OH group and a functional group that forms a bond with a vinyl group contained in a (meth) acrylate compound is 2-bromoisobutyryl bromide.

12. The method for preparing the positive electrode coating material for a lithium secondary battery according to claim 8, wherein the reaction of step (b) comprises a polymerization reaction.

13. The method for preparing the positive electrode coating material for a lithium secondary battery according to claim 8, wherein a mass ratio of the hydrocarbon structural unit having 1 to 10 carbon atoms and comprising 0 to 2 oxygens which comprises a functional group that forms a bond with the —COOH group or —OH group of step (a) and a functional group that forms a bond with a vinyl group contained in a (meth)acrylate compound to the graphene oxide containing one or more of a —COOH group and a —OH group on its surface is 0.7 to 1.3:1, and wherein a mass ratio of the (meth)acrylate structural unit grafted with a hydrocarbon group having 2 to 10 carbon atoms and comprising a cationic group of step (b) to the surface-modified graphene oxide is 1 to 10:1.

14. The method for preparing the positive electrode coating material for a lithium secondary battery according to claim 8, further comprising (c) reacting the reaction product prepared in step (b) with a lithium salt.

* * * * *